United States Patent
Paul et al.

[11] Patent Number: 6,040,250
[45] Date of Patent: *Mar. 21, 2000

[54] MULTI-LAYER THERMOFORMABLE LAMINATES AND METHODS OF THEIR MANUFACTURE

[75] Inventors: William C. Paul, Mt. Vernon; Gloria Sieloff, Evansville, both of Ind.

[73] Assignee: General Electric Company, Pittsfield, Mass.

[ * ] Notice: This patent is subject to a terminal disclaimer.

[21] Appl. No.: 09/094,147

[22] Filed: Jun. 9, 1998

Related U.S. Application Data

[62] Division of application No. 08/575,006, Dec. 19, 1995, Pat. No. 5,895,709, which is a continuation of application No. 08/265,528, Jun. 24, 1994, abandoned.

[51] Int. Cl.[7] .................. B32B 5/18; B32B 5/28
[52] U.S. Cl. ............... 442/61; 442/67; 442/154; 442/172; 442/180; 442/242; 442/263; 442/264; 442/266
[58] Field of Search ............... 442/61, 67, 154, 442/172, 180, 242, 263, 264, 266

[56] References Cited

U.S. PATENT DOCUMENTS

| | | |
|---|---|---|
| 3,788,923 | 1/1974 | Soliman . |
| 4,238,266 | 12/1980 | Steinberg et al. . |
| 5,175,198 | 12/1992 | Minnick et al. . |
| 5,354,604 | 10/1994 | Blakeman et al. . |
| 5,431,995 | 7/1995 | Narita et al. .................. 428/287 |

FOREIGN PATENT DOCUMENTS

| | | |
|---|---|---|
| 0 387 566 | 9/1990 | France . |
| 0 093284 | 4/1983 | Germany . |
| 1343702 | 1/1974 | United Kingdom . |
| 1398304 | 6/1975 | United Kingdom . |
| 024895 | 11/1981 | United Kingdom . |
| 096177 | 12/1983 | United Kingdom . |

*Primary Examiner*—Richard Weisberger

[57] ABSTRACT

Thermoformable multi-layer sheet products are manufactured by pressure laminating one or more molten polymeric films and superposed layers of glass cloth material such that the molten polymer impregnates the glass cloth layers.

15 Claims, 3 Drawing Sheets

MULTI-LAYER THERMOFORMABLE LAMINATES AND METHODS OF THEIR MANUFACTURE

This is a divisional of application Ser. No. 08/575,006 filed on Dec. 19, 1995, now U.S. Pat. No. 5,895,709 which is a continuation of Ser. No. 08/265,528 filed on Jun. 24, 1994, which is now abandoned.

FIELD OF THE INVENTION

The present invention relates to an on-line method of manufacturing thermoformable laminated sheet products, and products made by the method. More specifically, the present invention relates to a method of forming a core structure for laminates by extruding molten polymer into a film or sheet, superposing glass cloth layers on opposite sides of the polymer layer, passing the superposed sheets through a constant pressure compression nip, and laminating the resultant core structure.

BACKGROUND OF THE INVENTION

Steel and aluminum are widely used to fabricate structural components of automobiles and aircraft. Although these materials offer high impact resistance and rigidity, they suffer from various shortcomings. For example, aluminum is light weight but costly. Steel has a low cost but is heavy and not corrosion resistant. Neither material is thermoformable. A need exists for a material, specifically in sheet form which is inexpensive, lightweight, corrosion resistant and thermoformable.

An apparatus for continuously fabricating lightweight structural panels is disclosed in U.S. Pat. No. 4,897,146. This patent teaches heating a single layer core sheet to a temperature at which it is plastically deformable and passing it through a corrugating machine. The corrugated sheet is then passed through a compression nip and is adhered to superposed sheets of other similar or identical material to produce a panel. While the corrugated panel product is useful for many applications, it does not offer the impact resistance and rigidity necessary for automotive and aircraft applications.

Methods of on-line lamination of polyester structures are taught in U.S. Pat. No. 4,544,586. Ultraviolet radiation absorbing layers are laminated to a polyester core structure. Unfortunately, these materials, while resistant to ultraviolet degradation, fail to exhibit the properties necessary for automotive door, hood and side panel applications.

SUMMARY OF THE INVENTION

The present invention relates to the manufacture of thermoformable laminated sheet products by an on-line process which includes forming and laminating a multi-layer core structure. The core structure is made by extruding a molten film or sheet of polymeric material, superposing a layer of glass cloth on each side of the extruded polymer layer, and passing the superposed layers through a compression nip. Due to the compressive forces at the nip, at least some of the molten polymer impregnates the glass cloth material and becomes distributed throughout. In order to increase the strength and impact resistance of the core, reinforcing fillers may be combined with the polymer layer.

According to one embodiment of the present invention, the core may be laminated with at least one other layer of molten polymer in a compression nip or a platen press. Preferably, the core structure may be laminated on both sides with a neat polymer layer, that is, a polymer layer which is substantially free of any reinforcing or non-reinforcing fillers.

The present invention also relates to a method of manufacturing thermoformable sheet products comprising laminating alternating layers of polymer and glass cloth materials. As a structure is formed, the molten polymer flows into and impregnates the glass cloth. Adjacent layers of polymeric material contact each other within the glass cloth layer forming a strong bond.

The present invention further relates to multi-layer thermoformable laminated structures which include at least one intermediate layer of glass-filled polymer resulting in high impact resistance. Structures having more than one intermediate layer of glass-filled polymer exhibit particularly high impact resistance and rigidity.

The laminates according to the present invention can be thermoformed into a variety of structures and shapes, for example, automobile doors, hoods and side panels, and interior aircraft parts. The laminated structures replace comparable steel and aluminum parts and are lightweight, less expensive and more resistant to permanent deformation. In addition, lightweight structures can be produced which exhibit high impact resistance and rigidity.

BRIEF DESCRIPTION OF THE DRAWINGS

The invention may be more fully understood with reference to the accompanying drawings, wherein.

DETAILED DESCRIPTION OF THE INVENTION

Figure 1:
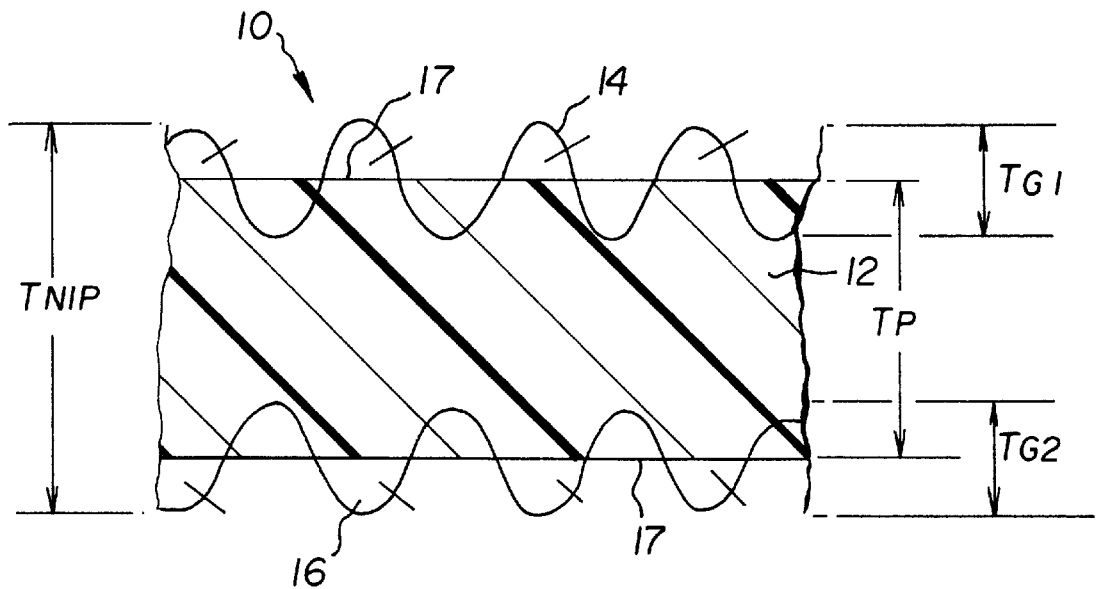
FIG. 1 is a fragmentary vertical section of a multi-layer core structure according to the present invention.

FIG. 1 is a fragmentary vertical section of a core structure 10 of the present invention. As with all the illustrations herein, the relative thicknesses of the polymer and glass cloth layers may be enlarged for clarity and are not necessarily to scale.

The core structure 10 comprises a layer of polymeric material 12 sandwiched between layers of glass cloth 14, 16. In the embodiment illustrated, the polymeric material or polymer layer 12 may be glass reinforced. The polymer layer 12 impregnates confronting portions of each of the glass cloth layers 14, 16 and forms a surface 17 within each glass layer. A portion of each glass layer protrudes from each surface 17 and results in a roughened bonding surface for later to be applied laminating layers, as described below.

Figure 2:
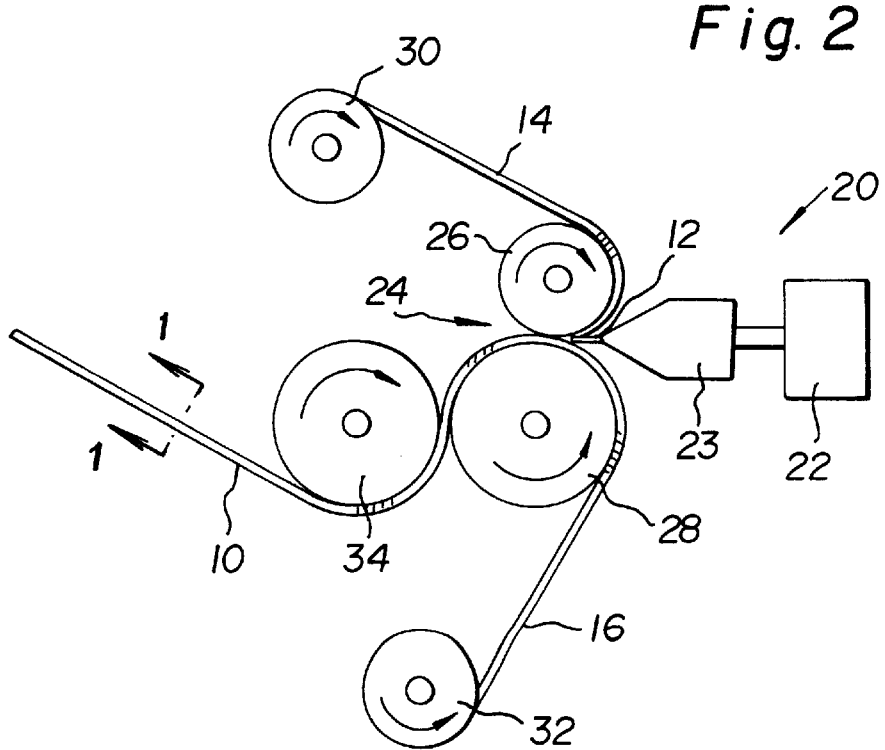
FIG. 2 is a diagrammatic view of the apparatus for producing a core structure according to the present invention.

An apparatus 20 for manufacturing the core 10 of the invention is illustrated in FIG. 2. While the invention also relates to the manufacture of multiple-layer laminated structures, for simplicity and ease of explanation, the core structure 10 formed in the apparatus illustrated in FIG. 2 has a three-layer configuration.

An extruder 22 supplies molten polymer through a die 23 to form polymer layer 12. The polymer layer 12 is supplied to a compression nip 24 formed by a pair of compression rollers 26 and 28. The glass cloth layers 14 and 16, each supplied as a continuous web from corresponding supply rolls 30 and 32, are carried into the nip 24 in confronting relationship with the polymer layer 12. It should be understood that the polymer material is sufficiently molten such that it flows into the glass cloth layers 14 and 16 forming the core 10. The resulting laminate is carried around an idler or guide roll 34 to a downstream processing station (not shown).

As can be seen in FIG. 2, the polymer layer 12 is supplied, as shown, as an extruded at least partially molten film. The molten polymer layer 12 is extruded immediately adjacent the compression nip 24 so that the polymer is still in a molten state as it passes through the nip 24. The compression rollers 26 and 28 may be heated to further ensure that the polymer 14 remains molten as it passes through the compression nip 24. The molten polymer layer 12 then flows into and impregnates the adjacent surface of each glass cloth material layer 14 and 16. To further insure impregnation, the layers of glass cloth material 14, 16 may be fed from corresponding supply rolls 30 and 32 such that they pass around a substantial portion of the surface of compression rollers 26, 28 and become preheated before entering the nip 24.

Also, if desired, the idler roller 34 may be temperature controlled to regulate the set up properties or polymer layer 12. As discussed hereafter it is also possible to extrude the polymer further away from the compression nip, although further temperature control may be required to ensure that the polymer is molten as it passes through the compression nip 24.

As shown in FIG. 1, the polymer layer 12 has a thickness $T_P$ and each glass cloth layer has a thickness $T_G$. The nip 24 formed between pressure rollers 26 and 28 provides a gap or separation defined $T_{NIP}$. The gap $T_{NIP}$ is less than the combined thicknesses of the three separate layers. As a result, the three layers 12, 14 and 16 are pressed together under significant pressure as they are fed through the nip 24. Thus, because the polymer layer 12 is at least partially molten, the pressure causes the polymer to penetrate and impregnate the confronting glass cloth layers 14 and 16.

Figure 3:
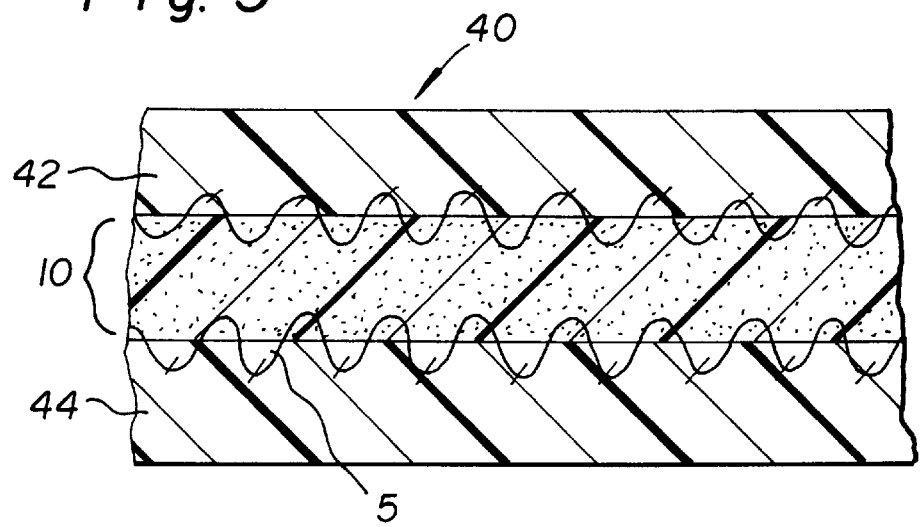
FIG. 3 is a fragmentary vertical section of a thermoformable laminated structure according to an embodiment of the present invention.

In accordance with another embodiment of the invention, it is desirable to laminate additional layers of polymeric material onto the core 10. For example, as shown in FIG. 3, a multi-layer laminate 40 is formed by laminating outer polymer layers 42 and 44 onto opposite sides of the core 10. In the embodiment illustrated, the outer layers 42 and 44 may be formed of neat polymer, i.e., having no fillers or the like.

Figure 4:
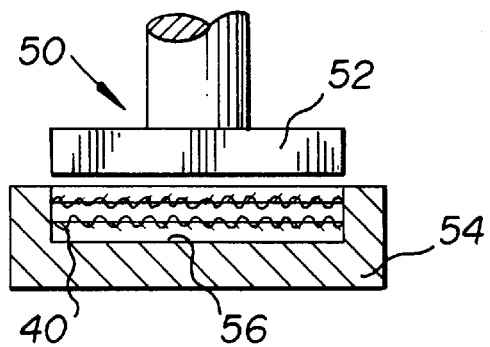
FIG. 4 is a partial cross-section of a platen press used in a method of producing a multi-layer laminate including the core structure of the present invention.

A platen press 50 (FIG. 4) may be employed to laminate the core 10 with outer layers 42 and 44 to form the multi-layer structure 40 illustrated in FIG. 3. The press 50 includes a heated piston 52, and a heated mold 54 having a mold cavity 56 shown in cross-section. The piston 52 is driven by a hydraulic or pneumatic cylinder (not shown).

The outer polymer layers 42 and 44 are superposed on opposite sides of the core 10. The core 10 and the two superposed polymer layers 42 and 44 are placed in the mold cavity 56 whereupon heat and pressure are supplied to fuse the outer layers 42 and 44 to the core 10. The laminating layers 42 and 44 become molten and impregnate the protruding glass cloth layers 14 and 16. The heat also may cause the central polymer layer 12 to become molten and thereby bond or form with the molten polymer material forming the outer layers 42 and 44. The resulting multi-layer laminate structure 40 (FIG. 3) is thermoformable, lightweight, and exhibits high impact resistance and rigidity. The laminate 40 also has good interior layer bonding strength resulting from the glass impregnation and fusion of the various polymer layers.

Figure 5:
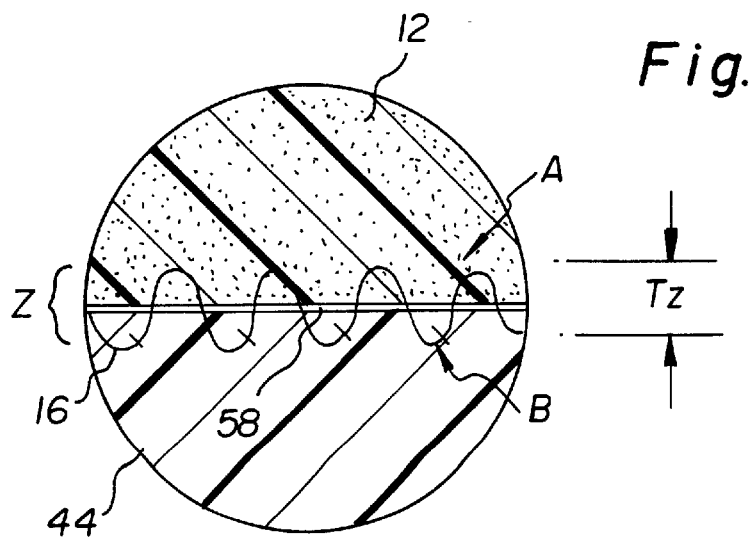
FIG. 5 is an enlargement of the encircled area shown in FIG. 3.

FIG. 5 is an enlargement of the encircled area of FIG. 3 showing the polymer layer 12, the adjacent glass cloth layer 16 and the outer polymer layer 44. The enlarged portion illustrates a boundary or interface 58 between the polymer layers 12 and 44 formed within the glass cloth material layer 16. In the exemplary embodiment, the polymer layer 44 impregnates the exposed glass cloth layer 16 of the core 10 and forms a bond with the polymer layer 14. As noted above, during lamination, the outer layers 42 and 44 and the polymer layer 12 become at least partially molten such that the layers melt together at each interface thereby resulting in an enhanced bond. This melting together occurs in a diffusion zone Z of thickness $T_z$ preferably confined within the glass cloth material layer and defined by the two opposing surfaces A, B of the glass cloth layer 16. Such diffusion between adjacent polymer layers advantageously improves the adhesion characteristics between them.

Figure 6:
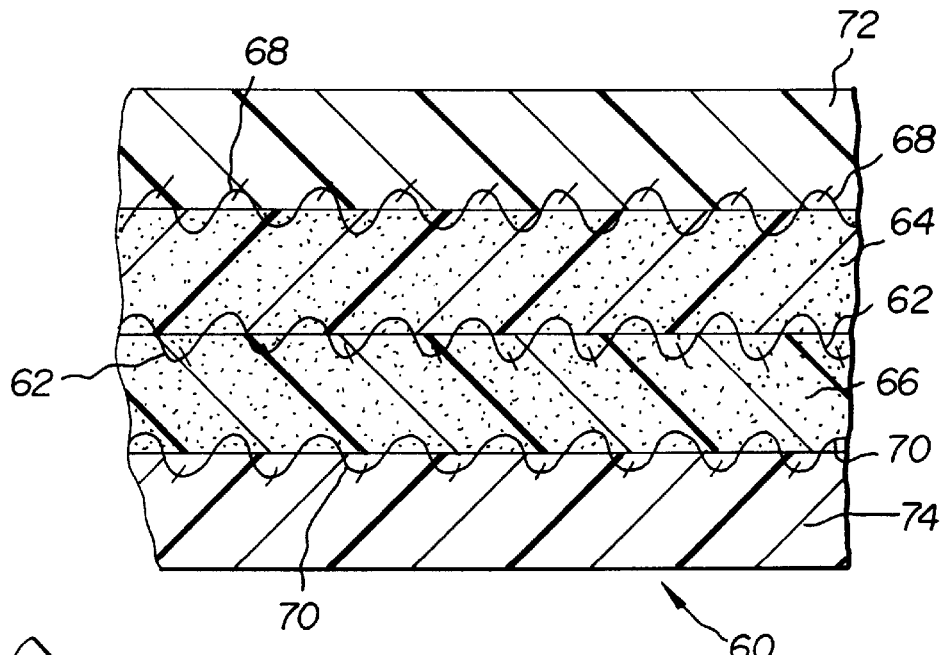
FIG. 6 is a fragmentary vertical section of another multi-layer laminate according to the present invention.

FIG. 6 is a fragmentary vertical section of another embodiment of the present invention featuring a seven-layer laminate 60. The arrangement is similar to the structure shown in FIGS. 3 and includes a central glass cloth layer 62, intermediate reinforced polymer layers 64 and 66 contacting each other within the central glass cloth layer 62, glass cloth layers 68 and 70 superposed with polymer layers 64 and 66, and outer neat polymer layers 72 and 74 bonded to the glass cloth layers 68 and 70. The reinforced polymer layers 64 and 66 contact the adjacent neat polymer layers 72 and 74 within the intermediate glass cloth layers 68 and 70.

Figure 7:
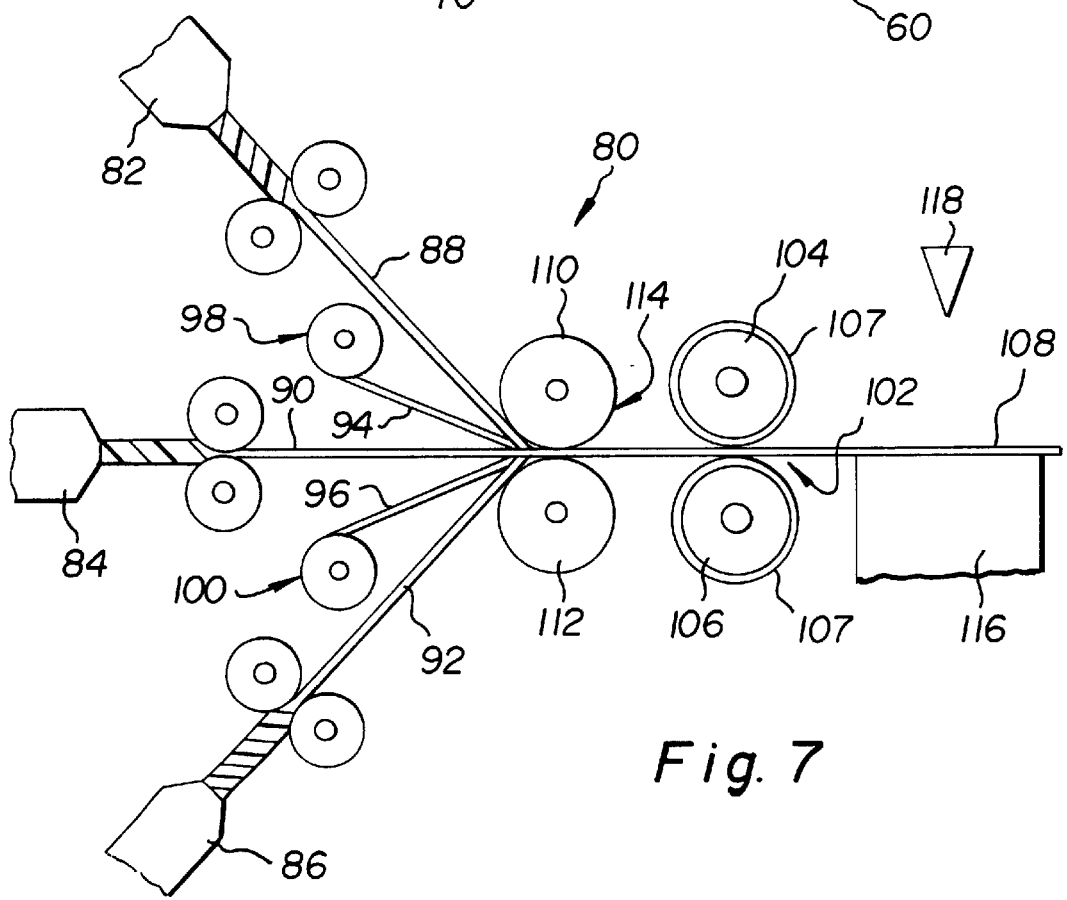
FIG. 7 is a diagrammatic view of an on-line apparatus for producing multi-layer laminates according to the present invention.

Another embodiment of the invention featuring a continuous on-line apparatus 80 is shown in FIG. 7. The apparatus 80 is suitable for the manufacture of a five-layer laminated structure similar to the arrangement shown in FIG. 3. However, as should be apparent from this disclosure the apparatus could readily be modified to produce seven-layer or even more complicated structures.

As illustrated in FIG. 7, three polymer melt extrusion devices are each provided with a die 82, 84 and 86 respectively providing a corresponding molten polymer film 88, 90 and 92. Webs of glass cloth material 94 and 96 are each fed from a respective supply 98 and 100. The films 88, 90 and 92, and webs 98 and 100 are fed as alternating layers into a nip 102 formed by pair of compression rolls 104 and 106. The webs of glass cloth and films are fed such that the resulting laminar structure 108 exits from the nip 102. The compression rollers 104 and 106 are preferably made of rubber or include a rubber coatings 107 thereon.

When the polymer films 88, 90 and 92 are extruded remote from the compression nip 102, as shown, it may be necessary to heat each polymer layer of the superposed structure before it enters the compression nip 102. This may be accomplished by a pair of heated rollers 110 and 112, located upstream of the compression rollers 104, 106. The heated rollers 110 and 112 heat the various polymer layers so that the polymeric material of each polymer layer enters the compression nip 102 in an at least partially molten condition. The heated rollers 110 and 112 also pre-heat the glass layers. The resultant structure 108 may be passed from the compression nip to a cutting station 116 where it may be cut into desired sizes by chopper 118.

The polymer layers incorporated in the laminated structures of the present invention may comprise polycarbonate, polypropylene, polyetherimide, polybutylene terephthalate and polymer blends. When multiple layers are formed, it is preferable to use similar or identical polymer materials for each layer. Some specific commerically available polymer resins which may be employed in the laminated structures of the present invention include products said under the trademarks LEXAN®, XENOY®, ULTEM® and VALOX® all available from GE Plastics, Pittsfield, Mass.

When reinforcement is employed glass fibers are a useful reinforcing material. Fiber sizes and weight ranges to be employed are recognized as known to those of skill in the art. It has been determined according to the present invention that polymer materials having glass fibers filled in an amount of between about 20 and about 30 percent by weight are particularly preferred. Exemplary reinforced polymers include, but are not limited to, 20% and 30% by weight glass-filled polyester/polycarbonate blends and polycarbonate resins.

In the exemplary embodiments below, the various polymeric layers have average thicknesses of between about 3 mils and about 60 mils because they provide lightweight structures having high impact resistance and rigidity. However, greater or lesser polymer layer thicknesses may be used depending upon the desired structure and the desired use of the resulting product. For laminated structures which are to be thermoformed into automotive doors, hoods and side panels, structures having five or seven alternating layers have been formed wherein each polymer layer has a layer thickness of between about 3 and about 20 mils. In a particular embodiment, each polymer layer has a thickness of between about 10 and about 20 mils. The glass cloth layers have thicknesses ranging from about 1 to about 20 mils, with the range of between about 3 and about 10 mils being preferred. The total thickness of the resultant structures for automotive and aircraft applications should be in the range of between about 50 and about 500 mils with a range of between about 60 and 250 about mils being preferred. Multi-layer structures having a total thickness of between about 50 and about 60 mils and polymer layer thicknesses of between about 10 and about 20 mils are preferred for many applications automotive and aircraft applications.

The glass cloth layers of the laminated structures according to the present invention include knitted and woven glass cloth such as that available from Varinit Corporation, Greenville, S.C. Structures comprising knitted glass cloth layers have superior thermoformability compared to structures comprising woven glass cloth layers. This discovery is based on the observation that knit materials have greater flexibility than woven materials. Tightly knitted cloth materials having small interstices allow the molten polymer to penetrate the material yet not pass through it. Glass cloth materials having a high fiber density typically exhibit very small interstices.

It has been found that laminated structures having a seven layer construction offer excellent physical properties, including high impact resistance and rigidity. The advantages of the seven-layer structure over the five-layer structure may be more fully understood with reference to the comparative Examples set forth below.

Sample configurations and test results showing the physical characteristics of five-layer and seven-layer laminates according to the invention are shown in Table I below. As can be seen, seven layer structures having alternating layers of polymer and knitted glass cloth and including two intermediate layers of reinforced polymer, exhibit double the impact resistance of comparably made five-layer structures having a single intermediate layer of reinforced polymer. The remarkable increase in impact resistance resulting from adding a second reinforced intermediate layer is not accompanied by any significant sacrifice of tensile and flexural properties.

Configurations for five-layer and seven-layer sample structures which were tested are as follows:

5 LAYER SAMPLE:
  Neat Film
  Glass Cloth
  Glass-Reinforced Polymer
  Glass Cloth
  Neat Film 7 LAYER SAMPLE:
  Neat Film
  Glass Cloth
  Glass-Reinforced Polymer
  Glass Cloth
  Glass-Reinforced Polymer
  Glass Cloth
  Neat Film The physical testing results are outlined below in Table I.

TABLE I

Test results on the sample structures made with the 8790 knitted glass cloth available from Varinit Corporation and neat and 30% glass-reinforced polycarbonate, and polyester/polycarbonate blend polymer layers.

| SAMPLE | # OF LAYERS MATERIAL | TENSILE MODULUS kpsi | FLEX MODULUS | MAX LOAD LB. | ENERGY MAX. LOAD FT. LB. | TOTAL ENERGY FT. LB. |
|---|---|---|---|---|---|---|
| 1 | 5 layer Polyester/ Polycarbonate Blend | 822 | 865 | 285.6 | 2.467 | 6.740 |
| 2 | 7 layer Polyester/ Polycarbonate | 785 | 814 | 530.2 | 6.585 | 13.462 |

TABLE I-continued

Test results on the sample structures made with the 8790 knitted glass cloth available from Varinit Corporation and neat and 30% glass-reinforced polycarbonate, and polyester/polycarbonate blend polymer layers.

| SAMPLE | # OF LAYERS MATERIAL | TENSILE MODULUS kpsi | FLEX MODULUS | MAX LOAD LB. | ENERGY MAX. LOAD FT. LB. | TOTAL ENERGY FT. LB. |
|---|---|---|---|---|---|---|
| 3 | Blend 5 layer Polycarbonate | 752 | 938 | 274.6 | 3.489 | 11.009 |
| 4 | 7 layer Polycarbonate | 705 | 976 | 839.1 | 12.433 | 23.238 |

As seen in Table I, the tensile and flexural properties of the five and seven layer samples are similar. However, there is a substantial difference in the impact strength between the two structures.

Tables II and III below show suitable operating conditions for manufacturing polyester/polycarbonate blend, and polycarbonate laminated structures in accordance with the present invention. In Tables II and III, the following designations apply:
T1=Initial temperature;
T2=temperature after 3 minutes;
T3=final temperature; and
T4=temperature after cooling.

TABLE II

Operating conditions to produce the polyester/polycarbonate blend composite samples 5–12.

| SAMPLE ID | RESIN GLASS WT. % | # OF LAYERS | MOLD SIZE | T1 (F) | T2 (F) | T3 (F) | T4 (F) | MOLDING CONDITIONS |
|---|---|---|---|---|---|---|---|---|
| 5 | 30 | 5 | 4" × 7" | 461 | 468 | 480 | 76 | 3 KLB - 3 min; 5 KLB - 5 min. Cooled under 5 KLB |
| 6 | 30 | 5 | 4" × 7" | 456 | 464 | 477 | 73 | |
| 7 | 30 | 7 | 4" × 7" | 450 | 456 | 482 | 130 | 4 KLB - 3 min; 6 KLB - 5 min. Cooled under 6 KLB |
| 8 | 30 | 7 | 4" × 7" | 440 | 448 | 481 | 140 | |
| 9 | 30 | 5 | 5.5" × 9.5" | 478 | 481 | 488 | 101 | 5 KLB - 3 min; 9 KLB - 5 min Cooled under 9 KLB |
| 10 | 30 | 5 | 5.5" × 9.5" | 471 | 472 | 476 | 101 | |
| 11 | 30 | 7 | 5.5" × 9.5" | 483 | 482 | 480 | 158 | 6 KLB - 3 min; 10 KLB - 5 min Cooled under 10 KLB |
| 12 | 30 | 7 | 5.5" × 9.5" | 463 | 464 | 473 | 126 | |

TABLE III

Operating conditions to produce the polycarbonate composite samples 13–23.

| SAMPLE ID | RESIN GLASS WT. % | # OF LAYERS | MOLD SIZE | T1 (F) | T2 (F) | T3 (F) | T4 (F) | MOLDING CONDITIONS |
|---|---|---|---|---|---|---|---|---|
| 13 | 20 | 7 | 4" × 7" | 515 | 522 | 540 | 190 | 3 KLB - 3 min; 5 KLB - 5 min Cooled under 5 KLB |
| 14 | 20 | 7 | 5.5" × 9.5" | 527 | 530 | 530 | 150 | 5 KLB - 3 min; 9 KLB - 5 min Cooled under 9 KLB |
| 15 | 30 | 5 | 4" × 7" | 558 | 543 | 543 | 143 | 3 KLB - 3 min; 5 KLB - 5 min Cooled under 5 KLB |
| 16 | 30 | 5 | 5.5" × 9.5" | 521 | 529 | 558 | 93 | 5 KLB - 3 min; 9 KLB - 5 min Cooled under 9 KLB |
| 17 | 30 | 7 | 4" × 7" | 489 | 518 | 552 | 130 | 4 KLB - 3 min; |

TABLE III-continued

Operating conditions to produce the
polycarbonate composite samples 13–23.

| SAMPLE ID | RESIN GLASS WT. % | # OF LAYERS | MOLD SIZE | T1 (F) | T2 (F) | T3 (F) | T4 (F) | MOLDING CONDITIONS |
|---|---|---|---|---|---|---|---|---|
| 18 | 30 | 7 | 5.5" × 9.5" | 504 | 522 | 541 | 120 | 6 KLB - 5 min<br>Cooled under 6 KLB<br>6 KLB - 3 min;<br>10 KLB - 5 min<br>Cooled under 10 KLB |
| 19 | 30 | 5 | 4" × 7" | 528 | 519 | 548 | 77 | 3 KLB - 3 min;<br>5 KLB - 5 min<br>Cooled under 5 KLB |
| 20 | 30 | 5 | 5.5" × 9.5" | 529 | 536 | 551 | 77 | 5 KLB - 3 min;<br>9 KLB - 5 min<br>Cooled under 9 KLB |
| 21 | 30 | 7 | 4" × 7" | 537 | 543 | 554 | 113 | 4 KLB - 3 min;<br>6 KLB - 5 min<br>Cooled under 6 KLB |
| 22 | 30 | 7 | 5.5" × 9.5" | 497 | 517 | 543 | 123 | 6 KLB - 3 min;<br>10 KLB - 5 min<br>Cooled under 10 KLB |
| 23 | 30 | 7 | 5.5" × 9.5" | 508 | 511 | 535 | 100 | 6 KLB - 3 min;<br>11 KLB - 5 min<br>Cooled under 10 KLB |

Although the present invention has been described in connection with preferred embodiments, it will be appreciated by those skilled in the art that additions, modifications, substitutions and deletions not specifically described may be made without departing from the spirit and scope of the invention defined in the appended claims.

What is claimed is:

1. A thermoformable multi-layer laminate structure having been made by a process comprising the steps of:
   forming a polymer layer of an at least partially molten thermoplastic polymeric material having opposite sides;
   superposing first and second layers of glass cloth materials in confronting relationship with said partially molten thermoplastic polymer layer on the opposite sides thereof; and
   passing the superposed layers through a compression nip providing a gap which is less than the combined thickness of the layers and engaging free surfaces of said glass cloth layers with the partially molten thermoplastic polymeric material therebetween whereby the compression nip forces said partially molten thermoplastic polymer layers to flow into and impregnate the first and second glass cloth layers and said free surfaces of said glass cloth layers protrude from said polymer layer to form a core structure.

2. A thermoformable multi-layer structure according to claim 1 wherein said thermoplastic polymer layer includes a reinforcing filler.

3. A multi-layer structure according to claim 1 wherein the glass cloth comprises knitted glass cloth material.

4. A multi-layer structure according to claim 1 wherein said glass cloth comprises woven glass cloth material.

5. A thermoplastic multi-layer structure according to claim 1 wherein said process further comprises the steps of:
   superposing at least one additional thermoplastic polymer layer in confronting relationship with the free surface of one of said glass cloth layers; and
   forcing said additional thermoplastic polymer layer to impregnate the last-mentioned protruding glass cloth layer to form a diffusion zone within the glass cloth layer with the thermoplastic layer of the core structure whereby a bond between the thermoplastic polymer layers is formed.

6. A thermoformable multi-layer structure comprising:
   at least one layer of thermoplastic polymeric material having opposite sides; and
   at least one pair of glass cloth layers superposed in confronting relationship with opposite sides of said thermoplastic polymeric layer, said thermoplastic polymeric layer partially impregnating each of said glass cloth layers whereby a core structure is formed with a free surface portion of each glass cloth layer protruding from each surface thereof whereby the structure is thermoformable and has high impact resistance and rigidity.

7. A thermoformable multi-layer structure according to claim 1 further comprising an additional layer of thermoplastic polymeric material superposed on the free surface of a selected one of said glass cloth layers and impregnating the same to form a diffusion zone within the glass cloth layer with the thermoplastic polymer layer of the core structure whereby a bond between the thermoplastic polymer layers is formed.

8. A thermoformable multi-layer structure according to claim 1 further comprising at least one additional thermoplastic polymer layer disposed on each opposite side of said core structure to form within a glass cloth layer a diffusion zone of thermoplastic polymer from said one additional thermoplastic polymer layer and the thermoplastic polymer layer of the core structure whereby a bond between said one additional thermoplastic polymer layer and the thermoplastic polymer layer of the core structure is formed.

9. A thermoformable multi-layer structure according to claim 1 further comprising at least one neat thermoplastic polymer layer impregnating one of said glass cloth layers and forming an outer surface of said structure and a diffusion zone within the glass cloth layer with the thermoplastic polymer layer of the core structure whereby a bond between the thermoplastic polymer layers is formed.

10. A thermoformable multi-layer structure according to claim 8 wherein at least one of said thermoplastic polymer layers is filled with glass fibers as a reinforcement.

11. A thermoformable multi-layer structure according to claim 8 comprising three layers of thermoplastic polymeric material alternating with two layers of glass cloth material forming a five layer structure in which the thermoplastic polymeric material forms outer surfaces of the structure.

12. A thermoformable multi-layer structure according to claim 8 comprising three layers of glass cloth material alternating four layers of thermoplastic polymeric material forming a seven layer structure in which thermoplastic polymeric material forms outer surfaces of the structure.

13. A thermoformable multi-layer laminated structure according to claim 8 wherein said thermoplastic polymeric material comprises at least one member selected from the group consisting of polycarbonate, polyetherimide, polyester, polypropylene, polybutylene terephthalate, and blends thereof.

14. A thermoformable multi-layer laminated structure according to claim 8 wherein said thermoplastic polymeric material comprises a glass filled thermoplastic polymeric material.

15. A thermoformable multi-layer laminated structure according to claim 14 wherein said thermoplastic polymeric material comprises between about 20 and about 30 percent by weight glass filler.

* * * * *